Patented July 12, 1938

2,123,249

UNITED STATES PATENT OFFICE 2,123,249

MANUFACTURE AND USE OF SYNTHETIC RESINS

William Henry Moss, London, England, assignor to Celanese Corporation of America, a corporation of Delaware No Drawing. Application July 6, 1935, Serial No. 30,165

14 Claims. (Cl. 260—2)

This invention relates to the manufacture and application of synthetic resins and is a continuation in part of my U. S. application S. No. 405,536 filed 7th November, 1929 which issued as Patent No. 2,015,083.

I have found that very valuable synthetic resins can be produced by condensing a ketone containing at least four carbon atoms with an aromatic compound containing two phenolic hydroxyl groups in the same ring. By the process of the invention it is possible to produce resins which are fusible and yet capable of withstanding relatively high temperatures without decomposition, and are compatible with cellulose acetate and other organic derivatives of cellulose and with many other types of synthetic resin, and are light fast. Resins made according to the invention also possess a high di-electric constant.

In producing the resins it is of particular advantage to employ as the phenolic compound resorcinol. The use of this compound in conjunction with ketones containing at least four carbon atoms enables resins of particularly valuable properties to be produced as will be illustrated below. Other phenolic compounds having two hydroxyl groups in the same ring may be employed, for example catechol and hydroquinone, and especially compounds in which the hydroxyl groups are in the meta-positions, as for example, orcinol.

Among suitable ketones special mention may be made of the aliphatic ketones, for example, methyl ethyl ketone and diethyl ketone, and of cyclic ketones such for example as cyclohexanone and the methyl cyclohexanones. Ketones containing aromatic groups for example acetophenone, benzophenone and phenyl acetone may also be employed.

The condensation is preferably effected in the presence of an acid condensing agent, for example, zinc chloride, ferric chloride and similar metallic chlorides, sodium bisulphate and particularly hydrochloric, sulphuric and phosphoric acids. The proportion of catalyst is preferably relatively small, e. g. 2 to 5 or 10% or even less, e. g. down to 0.5%, on the weight of the phenolic compound, although the proportion of catalyst may be considerably higher, e. g. 20 to 50% or even 100% on the weight of the phenolic compound. In general the less strongly acid catalysts such, for example, as zinc chloride, should be used in higher proportions than the strong acids such as hydrochloric and sulphuric acid. Alkaline catalysts may also be employed if desired.

The phenolic compound and the ketone may be reacted together in any suitable proportions. Preferably, however, the ketone is employed in amount (by weight) at least equal to that of the phenolic compound, and it may be employed in excess; for example from 1 to 4 parts by weight of ketone may be employed for each part of phenolic compound. By employing these proportions the removal of unreacted phenolic compound from the product is facilitated.

In order to obtain the best results, especially as regards light fastness, it is preferable to control carefully the reaction between the ketone and the phenolic compound, for example by employing at the beginning of the reaction a relatively low temperature and small amount of catalyst; a purer product is thereby produced, from which the removal of unreacted phenolic compound is comparatively easy.

The new resins are of great value for use in association with cellulose derivatives such as, for example, cellulose acetate, cellulose nitrate and cellulose ethers, combining as they do compatibility with the cellulose derivatives with a high degree of light fastness, particularly when they are first carefully freed from all traces of unreacted phenolic compound. Thus they may be incorporated in fabrics or in artificial filaments or films made of or containing cellulose acetate silk or the like, and they are also of value in the manufacture of lacquer compositions, insulating compositions, moulding powders, etc. which have a basis of cellulose acetate or other cellulose derivative. In general the new resins are soluble in benzene, alcohol and acetone.

The new resins may be employed in association with other resins, whether natural resins, e. g. manila, accaroides, pontianak, kauri, dammar, rosin and shellac, semi-synthetic, as ester gum; or synthetic, for instance fusible soluble phenolformaldehyde or diphenylolpropane formaldehyde resins, preferably prepared in the presence of acid catalysts.

Compositions containing the resins may also contain high, medium, or low boiling solvents, plasticizers, fire retardants, and/or pigments or dyes. For example, as low boiling solvents there may be employed acetone, ethyl alcohol, benzene, ethylene dichloride, or mixtures of two or more of these. Examples of medium and high boiling solvents are ethyl acetate, ethyl lactate, tetrachlorethane, benzyl alcohol and diacetone alcohol. The particular solvent or solvents employed depends on, among other things, the solubility characteristics of cellulose derivatives or other thermoplastic base materials present. As suitable plasticizers there may be mentioned diphenylol propane, triacetin, dibutyl tartrate, diethyl phthalate, and monomethyl sulphonamide, and among fire retardants, bromine derivatives of organic compounds such as brominated tricresyl phosphate. If pigments or dyes are used they may be those ordinarily employed in the paint and lacquer industries.

The following examples illustrate the preparation and some uses of the new resins:—

Example 1

Resorcinol is dissolved in its own weight of methyl ethyl ketone, and one part by weight of concentrated hydrochloric acid for every 25 parts of solution is slowly added, the mixture being kept cool throughout the addition.

When all the hydrochloric acid has been added, the mixture is heated to 60° C. for one hour, and then to 90° C. for one hour. At the end of this time a yellowish resin is formed which, when cooled, is hard and brittle.

To purify the resin from unreacted resorcinol, a certain amount of which is always present at this stage, it may be dissolved in three times its weight of ethyl alcohol, and re-precipitated by pouring the alcoholic solution slowly into five times its volume of water. Subsequent washing with hot water will remove both the alcohol and the resorcinol, and the product is a practically completely light-fast resin, melting at 140° C., which can be heated to 200° C. before decomposition sets in.

Example 2

Resorcinol is dissolved in its own weight of cyclo-hexanone, and one part of concentrated hydrochloric acid added for every 250 parts of the solution. A hard resin is formed in a few minutes, which may be purified in the manner described in Example 1. The purified resin is blue in colour and does not melt under hot water.

Example 3

Methyl butyl ketone is employed in place of methyl ethyl ketone in the process described in Example 1, the proportions by weight of ketone and resorcinol being the same as in that example.

Example 4

A film suitable for electrical insulation purposes is obtained by flowing a solution of the following composition:—

| | Parts by weight |
|---|---|
| Cellulose acetate (of medium viscosity) | 200 |
| Ketone-resorcinol resin (produced for instance according to Example 1 or 2) | 30 |
| Acetone | 950 |

The film may be from .001 to .003 inch thick.

Example 5

A solution of the following composition is suitable for use as an insulating varnish:—

| | Parts by weight |
|---|---|
| Cellulose acetate | 50 |
| Methyl ethyl ketone-resorcinol resin | 60 |
| Acetone | 160 |
| Ethyl alcohol | 40 |
| Benzene | 45 |

Cyclohexanone-resorcinol resin, or another of the resins of the invention, may partly or wholly replace the methyl ethyl ketone-resorcinol resin.

Example 6

The solution specified in Example 5, with in addition about 30 parts of ethyl lactate and 20 to 30 parts of pigment, provides a useful pigmented brushing lacquer. If desired, the pigment may be omitted.

Example 7

To produce a moulding powder the following composition is ground in a ball mill or other suitable mill:—

| | Parts by weight |
|---|---|
| Cellulose acetate | 100 |
| Methyl ethyl ketone- or cyclohexanone-resorcinol resin | 50 to 150 |

Example 8

A coating composition containing the resin may be made as follows:—

| | Parts by weight |
|---|---|
| Cellulose acetate | 10 |
| Synthetic resin | 1–20 |
| Acetone | 100 |

Example 9

The following is another example of coating composition:—

| | Parts by weight |
|---|---|
| Cellulose acetate | 10 |
| Synthetic resin | 1–20 |
| Acetone | 50 |
| Benzene | 25 |
| Alcohol (ethyl or denatured) | 25 |
| Diacetone alcohol | 20 |

Example 10

The following is an example of a solution that is suitable as an adhesive, and is particularly useful for causing a sheet of celluloid to adhere to surfaces of sheets of glass, cardboard, asbestos, metal, etc.

| | Parts by weight |
|---|---|
| Cellulose acetate | 20 |
| Synthetic resin | 25 |
| Acetone | 60 |
| Ethyl acetate | 30 |
| Ethyl lactate | 10 |

Example 11

The following is an example of a plastic composition:—

| | Parts by weight |
|---|---|
| Cellulose acetate | 100 |
| Synthetic resin | 40 |
| Monomethyl xylene sulphonamide | 10 |
| Alcohol | 50 |
| Benzene | 50 |

Example 12

The following is an example of a solution that may be employed for making artificial yarn by extruding through the orifices of a spinneret into a heated, evaporative atmosphere:—

| | Parts by weight |
|---|---|
| Cellulose acetate | 100 |
| Synthetic resin | 20 |
| Acetone | 400 |

Example 13

The following is a further formula for pigmented lacquer:—

| | Parts by weight |
|---|---|
| Cellulose acetate | 20 |
| Synthetic resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

Example 14

The following examples are given to illustrate the use of a synthetic resin in connection with cellulose nitrate for various purposes:—

(a) Coating composition may contain:

| | | |
|---|---|---|
| Cellulose nitrate | kilograms | 6 |
| Camphor | do | 2 |
| Diethyl phthalate | do | 2 |
| Synthetic resin | do | 10 |
| Benzene | litres | 20 |
| Alcohol | do | 20 |
| Butyl alcohol | do | 20 |
| Butyl acetate | do | 20 |
| Ethyl acetate | do | 30 |

(b) An adhesive solution suitable for use in the preparation of laminated glass may contain:

| | | |
|---|---|---|
| Cellulose nitrate | kilograms | 0.4 |
| Camphor | do | 0.1 |
| Dibutyl phthalate | do | 0.1 |
| Synthetic resin | do | 1.0 |
| Benzene | litres | 20 |
| Alcohol | do | 10 |
| Butyl alcohol | do | 20 |
| Butyl acetate | do | 20 |
| Ethyl acetate | do | 30 |

In the foregoing examples, the cellulose acetate may be replaced by cellulose propionate, cellulose butyrate, etc. Either the cellulose acetate or the cellulose nitrate may be replaced by cellulose ethers.

It is to be understood that the foregoing detailed description is given merely by way of illustration, and that many variations may be made therein, without departing from the spirit of my invention.

What I claim and desire to secure by Letters Patent is:—

1. Process for the manufacture of synthetic resins which comprises reacting a ketone selected from the group consisting of methyl ethyl ketone, methyl butyl ketone and cyclohexanone with an aromatic compound containing at least two phenolic hydroxyl groups in the same ring until resinification takes place, these reactants being the only substances present capable of condensing to form a synthetic resin.

2. Process for the manufacture of synthetic resins which comprises reacting a ketone selected from the group consisting of methyl ethyl ketone, methyl butyl ketone and cyclohexanone with an aromatic compound containing at least two phenolic hydroxyl groups in the same ring in the presence of an acid catalyst until resinification takes place, these reactants being the only substances present capable of condensing to form a synthetic resin.

3. Process for the manufacture of synthetic resins which comprises reacting a ketone selected from the group consisting of methyl ethyl ketone, methyl butyl ketone and cyclohexanone with resorcinol until resinification takes place, these reactants being the only substances present capable of condensing to form a synthetic resin.

4. Process for the manufacture of synthetic resins which comprises reacting a ketone selected from the group consisting of methyl ethyl ketone, methyl butyl ketone and cyclohexanone with resorcinol in the presence of hydrochloric acid until resinification takes place, these reactants being the only substances present capable of condensing to form a synthetic resin.

5. Process for the manufacture of synthetic resins which comprises reacting a ketone selected from the group consisting of methyl ethyl ketone, methyl butyl ketone and cyclohexanone with resorcinol in the presence of up to 4% of the weight of the reactants of hydrochloric acid until resinification takes place, these reactants being the only substances present capable of condensing to form a synthetic resin.

6. Process for the manufacture of synthetic resins which comprises reacting a ketone selected from the group consisting of methyl ethyl ketone, methyl butyl ketone and cyclohexanone with not more than its own weight of resorcinol until resinification takes place, these reactants being the only substances present capable of condensing to form a synthetic resin.

7. Process for the manufacture of synthetic resins, which comprises reacting methyl ethyl ketone with resorcinol until resinification takes place, these reactants being the only substances present capable of condensing to form a synthetic resin.

8. Process for the manufacture of synthetic resins, which comprises reacting methyl butyl ketone with resorcinol until resinification takes place, these reactants being the only substances present capable of condensing to form a synthetic resin.

9. Process for the manufacture of synthetic resins, which comprises reacting cyclohexanone with resorcinol until resinification takes place, these reactants being the only substances present capable of condensing to form a synthetic resin.

10. A synthetic resin obtainable by condensing a ketone selected from the group consisting of methyl ethyl ketone, methyl butyl ketone and cyclohexanone with an aromatic compound containing at least two phenolic hydroxyl groups in the same ring, these reactants being the only substances present capable of condensing to form a synthetic resin.

11. A synthetic resin obtainable by condensing a ketone selected from the group consisting of methyl ethyl ketone, methyl butyl ketone and cyclohexanone with resorcinol, these reactants being the only substances present capable of condensing to form a synthetic resin.

12. A synthetic resin obtainable by condensing methyl ethyl ketone with resorcinol, these reactants being the only substances present capable of condensing to form a synthetic resin.

13. A synthetic resin obtainable by condensing methyl butyl ketone with resorcinol, these reactants being the only substances present capable of condensing to form a synthetic resin.

14. A synthetic resin obtainable by condensing cyclohexanone with resorcinol, these reactants being the only substances present capable of condensing to form a synthetic resin.

WILLIAM HENRY MOSS.